US006966327B2

(12) United States Patent
Nguyen et al.

(10) Patent No.: US 6,966,327 B2
(45) Date of Patent: Nov. 22, 2005

(54) FLUID BALANCE CONTROL SYSTEM FOR USE IN A FUEL PROCESSOR

(75) Inventors: Kevin H. Nguyen, Missouri City, TX (US); W. Spencer Wheat, Missouri City, TX (US); Vesna R. Mirkovic, Pearland, TX (US)

(73) Assignee: Texaco Development Corporation, San Ramon, CA (US)

( * ) Notice: Subject to any disclaimer, the term of this patent is extended or adjusted under 35 U.S.C. 154(b) by 0 days.

(21) Appl. No.: 10/946,154

(22) Filed: Sep. 21, 2004

(65) Prior Publication Data

US 2005/0034773 A1   Feb. 17, 2005

Related U.S. Application Data

(62) Division of application No. 10/407,258, filed on Apr. 4, 2003, now Pat. No. 6,796,332.

(51) Int. Cl.[7] .......................... G05D 16/20; H01M 8/04
(52) U.S. Cl. .................. 137/14; 137/487.5; 137/883; 429/25; 429/34
(58) Field of Search ........................... 137/12, 14, 883, 137/487.5; 429/22, 25, 34

(56) References Cited

U.S. PATENT DOCUMENTS

| | | | |
|---|---|---|---|
| 4,046,956 A | 9/1977 | Fanciullo | |
| 4,075,396 A | 2/1978 | Grehier | |
| 4,673,624 A | 6/1987 | Hockaday | |
| 5,366,821 A | 11/1994 | Merritt et al. | |
| 5,731,101 A | 3/1998 | Sherif et al. | |
| 5,827,602 A | 10/1998 | Koch et al. | |
| 6,306,531 B1 | 10/2001 | Clingerman et al. | |
| 6,569,551 B2 | 5/2003 | Skala et al. | |
| 6,648,019 B2 | 11/2003 | Gagnon | |
| 6,670,064 B2 | 12/2003 | Keskula et al. | |
| 6,682,838 B2 | 1/2004 | Stevens | |
| 6,716,546 B2 | 4/2004 | Oglesby et al. | |
| 6,752,166 B2 | 6/2004 | Lull et al. | |
| 6,824,577 B2 | 11/2004 | Deshpande | |
| 6,830,060 B2 * | 12/2004 | Gagnon | 137/2 |
| 2002/0034669 A1 | 3/2002 | Kobayashi et al. | |
| 2002/0039672 A1 | 4/2002 | Aramaki | |

(Continued)

FOREIGN PATENT DOCUMENTS

JP     2000038990     2/2000

OTHER PUBLICATIONS

Suarez, et al., "Synthesis and physical-chemical properties of ionic liquids based on 1-n-butyl-3-methylimidazolium cation," *J. Chim. Phys.* 95:1626-1639 (1998).

(Continued)

*Primary Examiner*—Ramesh Krishnamurthy
(74) *Attorney, Agent, or Firm*—Williams, Morgan & Amerson; Frank C. Turner

(57) ABSTRACT

A method and apparatus for providing a balanced fluid supply through multiple feeds are disclosed. The method comprises supplying the fluid through a plurality of feeds from a common fluid accumulator; determining the fluid pressure in a common fluid accumulator; and controlling the fluid pressure in the common fluid accumulator responsive to the fluid pressure sensed therein to maintain the fluid pressure within a predetermined range. The balanced fluid supply comprises a common fluid accumulator; a plurality of feeds from the common fluid accumulator; and a control system capable of controlling the pressure of the fluid supplied from the common fluid accumulator to the feeds responsive to a determined pressure of fluid in the common fluid accumulator.

17 Claims, 2 Drawing Sheets

U.S. PATENT DOCUMENTS

| | | |
|---|---|---|
| 2002/0083846 A1 | 7/2002 | Deshpande et al. |
| 2002/0088740 A1 | 7/2002 | Krause et al. |
| 2002/0090326 A1 | 7/2002 | Deshpande |
| 2002/0090327 A1 | 7/2002 | Deshpande |
| 2002/0090334 A1 | 7/2002 | Stevens et al. |
| 2002/0094310 A1 | 7/2002 | Krause et al. |
| 2002/0098129 A1 | 7/2002 | Martin et al. |

OTHER PUBLICATIONS

Wilkes, et al., "Air and Water Stable 1-Ethyl-3-methylimidazolium Based Ionic Liquids," *J. Chem. Soc., Chem. Commun.* 965-967 (1992).

Fannin, Jr., et al., "Properties of 1,3-Dialkylimidazolium Chloride-Aluminum Chloride Ionic Liquids. 2. Phase Transitions, Densities, Electrical Conductivities, and Viscosities," *J. Phys. Chem.* 88:2614-2621 (1984).

Fuller, et al., "Structure of 1-Ethyl-3-methylimidazolium Hexafluorophosphate: Model for Room Temperature Molten Salts," *J. Chem. Soc., Chem. Commun.* 299-300 (1994).

Bowlas, et al., "Liquid-crystalline Ionic liquids," *Chem. Commun.* 1625-1626 (1996).

Bonhote, et al., "Hydrophobic, Highly Conductive Ambient-Temperature Molten Salts," *Inorg. Chem.* 35:1168-1176 (1996).

\* cited by examiner

FLUID BALANCE CONTROL SYSTEM FOR USE IN A FUEL PROCESSOR

The present application is a divisional application of U.S. Ser. No. 10/407,258, filed Apr. 4, 2003, the complete disclosure of which is incorporated herein by reference.

BACKGROUND OF THE INVENTION

1. Field of the Invention

The present invention pertains to fluid supplies for fuel processors, and, more particularly, to a fluid balance control system for use in a fuel processor.

2. Description of the Related Art

Fuel cell technology is an alternative energy source for more conventional energy sources employing the combustion of fossil fuels. A fuel cell typically produces electricity, water, and heat from a fuel and oxygen. More particularly, fuel cells provide electricity from chemical oxidation-reduction reactions and possess significant advantages over other forms of power generation in terms of cleanliness and efficiency. Typically, fuel cells employ hydrogen as the fuel and oxygen as the oxidizing agent. The power generation is proportional to the consumption rate of the reactants.

A significant disadvantage which inhibits the wider use of fuel cells is the lack of a widespread hydrogen infrastructure. Hydrogen has a relatively low volumetric energy density and is more difficult to store and transport than the hydrocarbon fuels currently used in most power generation systems. One way to overcome this difficulty is the use of "fuel processors" or "reformers" to convert the hydrocarbons to a hydrogen rich gas stream, commonly referred to as "reformate", which can be used as a feed for fuel cells. Hydrocarbon-based fuels, such as natural gas, LPG, gasoline, and diesel, require conversion processes to be used as fuel sources for most fuel cells. Current art uses multi-step processes combining an initial conversion process with several clean-up processes. The initial process is most often steam reforming ("SR"), autothermal reforming ("ATR"), catalytic partial oxidation ("CPOX"), or non-catalytic partial oxidation ("POX"). The clean-up processes are usually comprised of a combination of desulfurization, high temperature water-gas shift, low temperature water-gas shift, selective CO oxidation, or selective CO methanation. Alternative processes include hydrogen selective membrane reactors and filters.

Thus, many types of fuels can be used; some of them hybrids with fossil fuels, but the ideal fuel is hydrogen. If the fuel is, for instance, hydrogen, then the combustion is very clean and, as a practical matter, only the water is left after the dissipation and/or consumption of the heat and the consumption of the electricity. Most readily available fuels (e.g., natural gas, propane and gasoline) and even the less common ones (e.g., methanol and ethanol) include hydrogen in their molecular structure. Some fuel cell implementations therefore employ a "fuel processor" that processes a particular fuel to produce a reformate stream used to fuel the fuel cell.

The handling of fluids is consequently an important component of fuel processor design. Typically, for instance, several aspects of the fuel processor's operation require a supply of air. Fuel processors therefore frequently have an air supply that feeds air to the parts of the fuel processor needing air. In a typical single-source air supply system, air coming off of a compression device (blower or compressor) is split up to deliver fractions of the supply to various sub-units within the fuel processor. Each air line branching off to each sub-unit is metered and monitored by a flow controller and flow meter or a combination of both in one unit. However, in this configuration, the upstream pressure of the flow controllers (downstream pressure of the compression device) fluctuates when the controllers are opening and closing. As a result, the flows fluctuate, causing an undesirable imbalance in air to fuel ratio. The imbalance causes inconsistency in air flows to the various downstream sub-units, potentially causing upset conditions. Some approaches try to remedy this effect by providing independent air sources for each of the sub-units. However, this leads to more costly components, complicated control schemes, and increased potential breakdown of additional components. Still others have used orifice plates to meter flow to various units. This tends to make the design complicated as orifice plates have to be adjusted once the air demands change. Similar problems are encountered with the handling of other fluids.

The present invention is directed to resolving, or at least reducing, one or all of the problems mentioned above.

SUMMARY OF THE INVENTION

A method and apparatus for providing a balanced fluid supply through multiple feeds are disclosed. The method comprises supplying the fluid through a plurality of feeds from a common fluid accumulator; determining the fluid pressure in a common fluid accumulator; and controlling the fluid pressure in the common fluid accumulator responsive to the fluid pressure sensed therein to maintain the fluid pressure within a predetermined range. The balanced fluid supply comprises a common fluid accumulator; a plurality of feeds from the common fluid accumulator; and a control system capable of controlling the pressure of the fluid supplied from the common fluid accumulator to the feeds responsive to a determined pressure of fluid in the common fluid accumulator.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
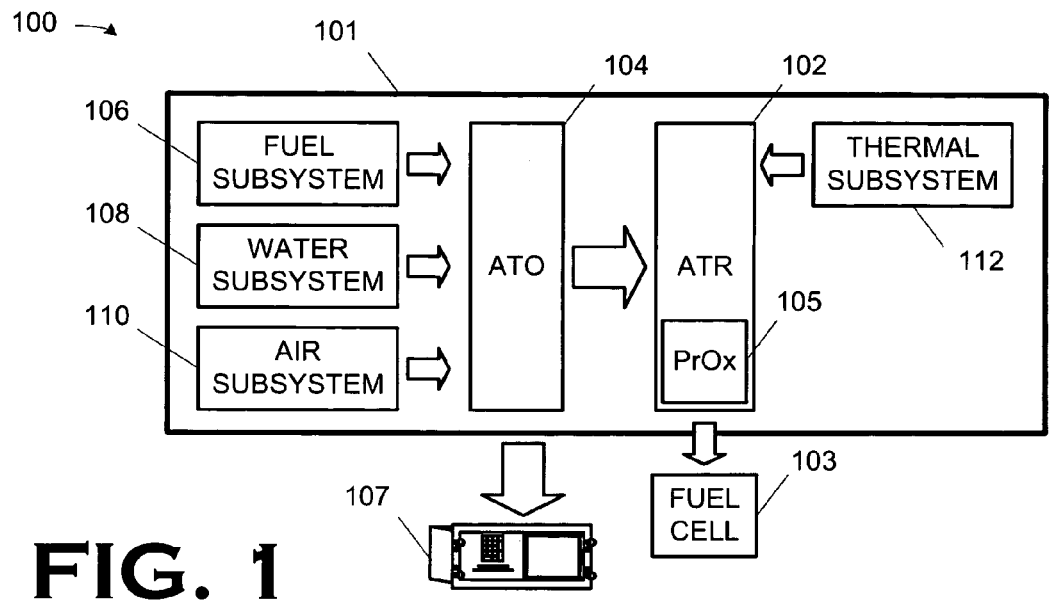
FIG. 1 illustrates one particular embodiment of a fuel processor assembled and operated in accordance with the present invention.

FIG. 1 illustrates one embodiment of an apparatus 100 assembled and operated in accordance with the present invention. The apparatus 100 comprises a fuel processor 101, a fuel cell 103, and a control system 107. The fuel cell 103 is preferably a Proton Exchange Membrane ("PEM") fuel cell, but other types of fuel cells may be used. The invention is not limited by the implementation of the fuel cell 103. More particularly, in the illustrated embodiment, the fuel processor 100 comprises several modular physical subsystems, namely:

- an autothermal reformer ("ATR") 102 that performs the oxidation-reduction reaction that reforms the fuel input to the fuel processor 100 into a gas for a fuel cell 103, and which employs a preferential oxidizer 105 to that end;
- an oxidizer 104, which is an anode tailgas oxidizer ("ATO") in the illustrated embodiment, that mixes steam, fuel, and air to create a fuel mixture delivered as a reformate to the ATR 102;
- a fuel subsystem 106, that delivers an input fuel (natural gas, in the illustrated embodiment) to the oxidizer 104 for mixing into the reformate delivered to the ATR 102;
- a water subsystem 108, that delivers water to the oxidizer 104 for mixing into the reformate delivered to the ATR 102;
- an air subsystem employing a closed loop, feedback control technique to maintain a constant pressure of air supplied to the ATR 102, the preferential oxidizer 105, and the oxidizer 104 from a common air source;
- a thermal subsystem 112, that regulates the operational temperatures of the ATR 102 and the oxidizer 104; and
- a control system 107 capable of controlling the operation of the ATR 102, the oxidizer 104, the fuel subsystem 106, the water subsystem 108, the air subsystem 110, and the thermal subsystem 112.

Figure 2:
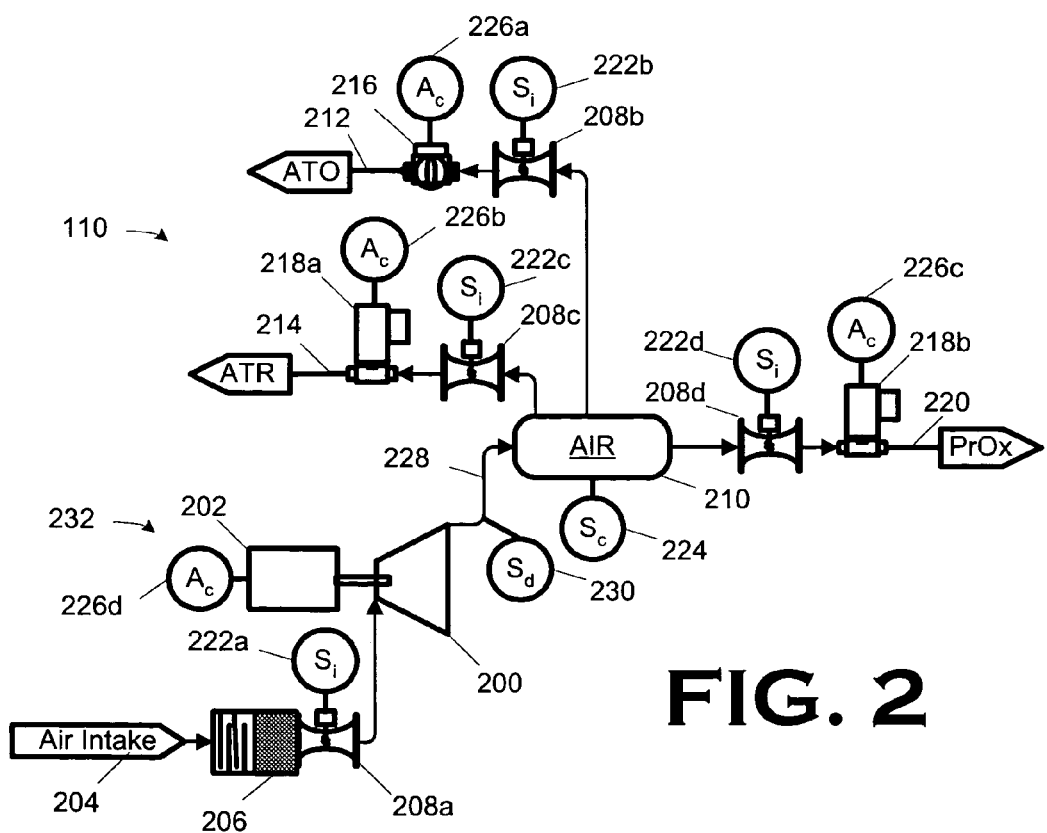
FIG. 2 details the air subsystem of the fuel processor in FIG. 1.

Particular implementations of the air subsystem 110 are illustrated in FIG. 2.

FIG. 2 depicts one particular implementation of the air subsystem 110. A compressor 200, including a motor 202, receives filtered air from the ambient atmosphere via an air intake 204, a filter 206, and a flow meter 208a and compresses it into an accumulator 210. The air from the accumulator 210 is then distributed through two feeds ATO, ATR over the lines 212, 214, including the flow meters 208b, 208c and control valves 216, 218a to the oxidizer 104 and the ATR 102. The air from the accumulator 210 is also distributed through a feed PrOx over the line 220 including a flow meter 208d and a control valve 218b to the preferential oxidizer 105. Since the accumulator 210 supplies air to each of the feeds ATO, ATR, and PrOx, the air subsystem 110 provides a common air source for these three feeds.

Each of the flow meters 208a–208d includes a respective instrumentation sensor 222a–222d through which it measures the flow of air therethrough. Note that some embodiments may omit the instrumentation sensors 222a–222d. The accumulator 210 includes a pressure sensor 224. Each of the motor 202, control valve 216, control valves 218a–218b includes a respective actuator 226a–226d. The line 228 between the compressor 200 and the accumulator 210 includes, in the illustrated embodiment, a diagnostic sensor 230 for measuring the temperature of the air in the line 228. The instrumentation sensors 222a–222d, pressure sensor 224, and actuators 226a–226d are utilized to control the operation of the air subsystem 110 in a manner described more fully below.

Figure 3A:
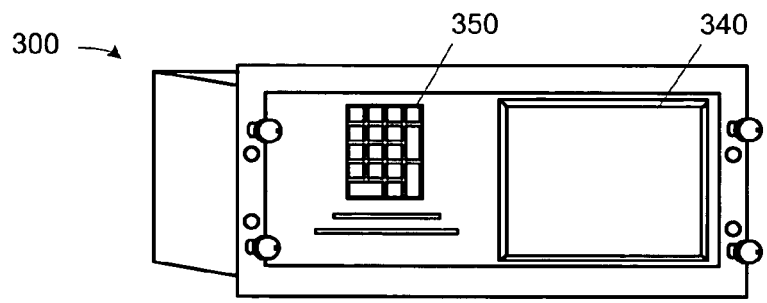
FIG. 3A and FIG. 3B conceptually illustrate a computing apparatus as may be used in the implementation of one particular embodiment of the present invention.
Figure 3B:
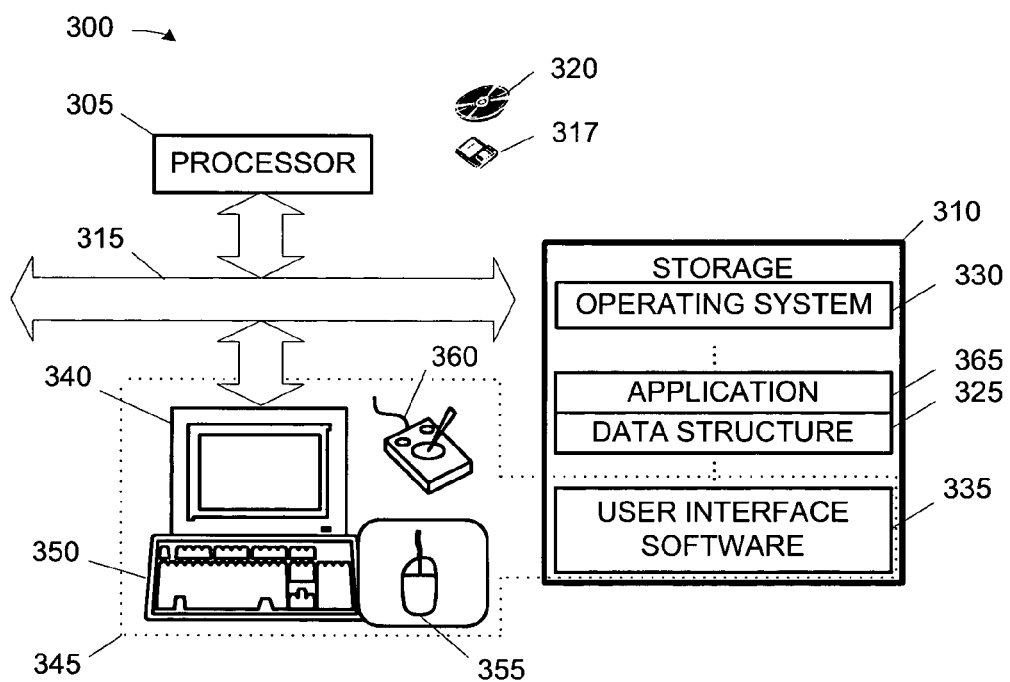

The apparatus 100 also includes the control system 107. One particular implementation 300 of the control system 107, first shown in FIG. 1, is illustrated in FIG. 3A and FIG. 3B. Note that, in some embodiments, the control system may be implemented on a computing system comprising a number of computers such as the control system 107, each of which may control some designated facet of the operation of the fuel processor 101. However, in the illustrated embodiment, the computing apparatus 300 controls all aspects of the fuel processor 101 operation not under manual control. The computing apparatus 300 is rack-mounted, but need not be rack-mounted in all embodiments. Indeed, this aspect of any given implementations is not material to the practice of the invention. The computing apparatus 300 may be implemented as a desktop personal computer, a workstation, a notebook or laptop computer, an embedded processor, or the like.

The computing apparatus 300 illustrated in FIG. 3A and FIG. 3B includes a processor 305 communicating with storage 310 over a bus system 315. The storage 310 may include a hard disk and/or random access memory ("RAM") and/or removable storage such as a floppy magnetic disk 317 and an optical disk 320. The storage 310 is encoded with a data structure 325 storing the data set acquired as discussed above, an operating system 330, user interface software 335, and an application 365. The user interface software 335, in conjunction with a display 340, implements a user interface 345. The user interface 345 may include peripheral I/O devices such as a key pad or keyboard 350, a mouse 355, or a joystick 360. The processor 305 runs under the control of the operating system 330, which may be practically any operating system known to the art. The application 365 is invoked by the operating system 330 upon power up, reset, or both, depending on the implementation of the operating system 330.

The present invention employs a closed-loop control for the compressor 200 (or, in some embodiments, an air blower) with feedback from the pressure sensor 224 inside the accumulator 210 to maintain a fixed pressure feed to the ATR 102, the preferential oxidizer 103, and the oxidizer 104. Each individual air supply line 212, 214, and 220 is controlled and monitored by a flow controller (i.e., the control valves 216, 218a–218b) and a flow meter 208b–208d. Inlet pressure to each of these flow controllers 216, 218a–218b is maintained constant, therefore, fluctuations in the flow rates are eliminated. This method enables the ability to quickly meet air flow requests to the process units without cross-interfering and negatively affecting the other process units.

More particularly, the application 365 (shown in FIG. 3B) residing in the storage 310 is a software implemented control system. The application 310 reads the signal generated by the pressure sensor 224 indicating the pressure in the accumulator 210. In some embodiments, the application 310 may also read the signals generated by the instrumentation sensors 222a–222d indicating the pressure in the supply lines 212, 214, and 220, respectively, although this pressure should be the same as that in the accumulator 210. Some alternative embodiments may also read the signal generated by the instrumentation sensor pressure sensor 224a on the air intake 204.

The application 310 signals the actuators 226a–226a to open and close the control valves 216, 218a–218b to provide air in the desired volumes and pressures to the oxidizer 104, ATR 102, and preferential oxidizer 105, respectively. As will be appreciated by those skilled in the art having the benefit of this disclosure, the desired pressures and volumes will be a function of the operational characteristics of the oxidizer 104, ATR 102, and preferential oxidizer 105. Thus, the precise values will be implementation specific, and are not germane to the practice of the invention. Similarly, although a single pressure may be preferred for each of the oxidizer 104, ATR 102, and preferential oxidizer 105, specifications for pressures are typically pressure ranges. Thus, the object is not so much to achieve a particular pressure, but to maintain the pressure on the inlets to the control valves 216, 218a–218b within a specified range.

The application 310 also signals the actuator 226d to cycle the motor 202 coupled to the compressor 202 to maintain the proper pressure in the accumulator 210 as measured by the pressure sensor 224 and in the supply lines 212, 214, and 220. In the illustrated embodiment, this determination is made by sensing the pressure in the accumulator 210, as described above. However, in some alternative embodiments, the determination may be made by sensing the pressure in anywhere between the compressor 220 and the accumulator 210, i.e., anywhere in the line 228 feeding the accumulator 220. If the sensed pressure in the accumulator 210 drops below a predetermined level, or, more precisely, outside specified range of pressure, then the application 310 actuates the motor 202 to raise the pressure in the accumulator 210.

Thus, in operation, the application 310 is aware of the desired pressure in the accumulator 210 and the volumes of air to be delivered over the supply lines 212, 214, and 220 to the ATR 102, the preferential oxidizer 103, and the oxidizer 104. This information may be, for instance, retrieved from the data structure 325 (shown in FIG. 3B). Through the instrumentation sensors 222b–222d, the application 310 monitors the air flow in the supply lines 212, 214, and 220. Supplying air to the ATR 102, oxidizer 104 and PrOx 105 leads to a drop in pressure inside the accumulator 210. The pressure sensor 224 detects the pressure fluctuation and sends an output signal to the application 310. When the application 310 detects a signal from pressure sensor 224 and determines that the pressure in the accumulator 210 has deviated from the desired pressure set point, the application 310 signals the actuator 226d to increase the speed to the motor 202. This ramps up the air flow to the accumulator 210. This maintains the pressure in the accumulator 210 at the desired pressure set point. As the pressure in the accumulator 210 is maintained at the desired set point, the pressure on the inlets to the control valves 216, 218a–218b is maintained steady, regardless of the air flow rates in lines 212, 214, and 220.

The air supply by the compressor 200 through the accumulator 210 is therefore controlled in a closed-loop fashion using feedback from the instrumentations pressure sensor pressure sensor 224. The air supply subsystem 110 employs this closed-loop, feedback control to maintain a constant pressure to control valves 216, 218a–218b. Consequently, pressure drop across the orifices of the control valves 216, 218a–218b is also maintained constant. As previously mentioned, the accumulator 210 receives air from the compressor 200 via the line 228 and supplies air to each of the feeds ATO, ATR, and PrOx.

In this sense, the accumulator 210 acts as an air manifold. However, whereas a manifold has zero dead volume, the accumulator 210 is designed to have enough dead volume to handle pressure fluctuations and to allow time for the signal, sent by pressure sensor pressure sensor 224, to be received by the actuator 226d and for the closed-loop, feedback control to take place, when a fluctuation in pressure takes place inside the accumulator 210. Pressure fluctuations are more gradual and will not greatly affect flows in lines 212, 214, and 220.

Note that the illustrated embodiment handles air, a particular, gaseous fluid. The invention may also be applied to other types of fluids, such as water or fuel for the fuel processor. The differences in the nature of the fluids may permit or necessitate differences in implementation. For instance, to handle a liquid (e.g., water), the compressor 200 in FIG. 2 can be replaced by a pump. Thus, the compressor 200 is but one example of a fluid moving device that may be used to implement various alternative embodiments depending upon the fluid being handled. Other modifications and/or substitutions to the illustrated embodiment may also be desired to accommodate application of the invention to other fluids.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for controlling the pressure in a plurality of feeds in a fuel processor, comprising:
   supplying fluid through a plurality of feeds from a common fluid accumulator, wherein supplying fluid includes metering the flow of fluid from the common fluid accumulator in each of the feeds;
   determining the fluid pressure in the common fluid accumulator; and
   controlling the fluid pressure in the common fluid accumulator responsive to the fluid pressure sensed therein to maintain the fluid pressure within a predetermined range.

2. The method of claim 1, wherein determining the fluid pressure in the common fluid accumulator includes sensing the pressure in the common fluid accumulator.

3. The method of claim 1, wherein determining the fluid pressure in the common fluid accumulator includes sensing the pressure in a feed to the common fluid accumulator.

4. The method of claim 1, wherein supplying fluid includes providing fluid to the common fluid accumulator.

5. The method of claim 4, wherein providing fluid to the common fluid accumulator includes sensing the pressure of fluid provided to the common fluid accumulator.

6. The method of claim 1, wherein supplying the fluid includes supplying air.

7. The method of claim 1, further comprising at least one of:
  sensing the fluid pressure in each of the feeds; and
  sensing the fluid pressure of the fluid supplied to the common fluid accumulator.

8. The method of claim 7, wherein controlling the fluid pressure in the common fluid accumulator includes controlling the fluid pressure in the common fluid accumulator responsive to the sensed fluid pressure in the feeds or the fluid supplied to the common fluid accumulator.

9. A balanced fluid supply in a fuel processor, comprising:
  a common fluid accumulator;
  a plurality of feeds from the common fluid accumulator, wherein each feed includes:
    a supply line;
    a flow controller capable of controlling the flow of fluid from the common fluid accumulator through the respective supply line; and
    a sensor measuring the inlet pressure to the respective flow controller; and
  a control system capable of controlling the pressure of the fluid supplied from the common fluid accumulator to the feeds responsive to a determined pressure of fluid in the common fluid accumulator.

10. The fluid supply of claim 9, wherein the fluid pressure in the common fluid accumulator is determined by sensing the pressure in the common fluid accumulator.

11. The fluid supply of claim 9, wherein the fluid pressure in the common fluid accumulator is determined by sensing the pressure in a feed to the common fluid accumulator.

12. The fluid supply of claim 9, further comprising:
  a fluid intake;
  a compressor actuated by the control system to provide fluid from the fluid intake to the common fluid accumulator responsive to the pressure sensed in the common fluid accumulator.

13. The fluid supply of claim 12, further comprising a fluid flow sensor on the fluid intake.

14. The fluid supply of claim 9, wherein the control system includes a programmed computing apparatus capable reading a signal indicating the fluid pressure in the common fluid accumulator and signaling to maintain the fluid pressure.

15. The fluid supply of claim 9, wherein the control system is capable of actuating the flow controller in each feed.

16. The fluid supply of claim 9, wherein the control system is capable of controlling the pressure of the fluid supplied from the common fluid accumulator responsive to the fluid pressure sensed in each feed by the sensor.

17. A method for controlling the pressure in a plurality of feeds in a fuel processor, comprising:
  supplying the fluid through a plurality of feeds from a common fluid accumulator;
  sensing the fluid pressure in each of the feeds;
  determining the fluid pressure in a common fluid accumulator; and
  controlling the fluid pressure in the common fluid accumulator responsive to the fluid pressure sensed therein to maintain the fluid pressure within a predetermined range, and wherein controlling the fluid pressure in the common fluid accumulator further includes controlling the fluid pressure in the common fluid accumulator responsive to the sensed fluid pressure in the feeds.

* * * * *